United States Patent
Barsoum et al.

(10) Patent No.: US 9,584,790 B2
(45) Date of Patent: Feb. 28, 2017

(54) EDGE PRESERVING DEPTH FILTERING

(71) Applicant: MICROSOFT TECHNOLOGY LICENSING, LLC, Redmond, WA (US)

(72) Inventors: Emad Barsoum, Sammamish, WA (US); Craig Peeper, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 744 days.

(21) Appl. No.: 13/908,923

(22) Filed: Jun. 3, 2013

(65) Prior Publication Data

US 2014/0354775 A1 Dec. 4, 2014

(51) Int. Cl.
| | |
|---|---|
| H04N 15/00 | (2006.01) |
| H04N 13/00 | (2006.01) |
| G01S 17/89 | (2006.01) |
| G01S 7/491 | (2006.01) |

(52) U.S. Cl.
CPC ....... H04N 13/0018 (2013.01); G01S 7/4912 (2013.01); G01S 17/89 (2013.01)

(58) Field of Classification Search
CPC ............. H04N 13/0239; H04N 13/005; H04N 13/0296
See application file for complete search history.

(56) References Cited

U.S. PATENT DOCUMENTS

| | | | |
|---|---|---|---|
| 5,534,992 A | | 7/1996 | Takeshima et al. |
| 7,791,715 B1 * | | 9/2010 | Bamji ............ G01C 3/08 356/4.01 |
| 2011/0187820 A1 | | 8/2011 | Gilboa et al. |
| 2012/0262340 A1 | | 10/2012 | Hassan et al. |

FOREIGN PATENT DOCUMENTS

| | | | | |
|---|---|---|---|---|
| BE | EP 2538242 A1 * | 12/2012 | ............ | G01S 17/89 |
| CN | 102393515 A | 3/2012 | | |
| EP | 1160585 A2 | 12/2001 | | |
| EP | 2128693 A1 | 12/2009 | | |
| EP | 2538242 A1 | 12/2012 | | |

OTHER PUBLICATIONS

ISA European Patent Office, International Search Report and Written Opinion Issued in Application No. PCT/US2014/040108, Sep. 18, 2014, WIPO, 10 Pages.

(Continued)

*Primary Examiner* — Chikaodili E Anyikire
(74) *Attorney, Agent, or Firm* — Brianna Hinojosa-Flores; Judy Yee; Micky Minhas

(57) ABSTRACT

A scene is illuminated with modulated illumination light that reflects from surfaces in the scene as modulated reflection light. Each of a plurality of pixels of a depth camera receive the modulated reflection light and observe a phase difference between the modulated illumination light and the modulated reflection light. For each of the plurality of pixels, an edginess of that pixel is recognized, and the phase difference of that pixel is smoothed as a function of the edginess of that pixel.

20 Claims, 5 Drawing Sheets

(56) References Cited

OTHER PUBLICATIONS

IPEA European Patent Office, International Preliminary Report on Patentability Issued in Application No. PCT/US2014/040108, Sep. 4, 2015, WIPO, 7 pages.

IPEA European Patent Office, Written Opinion of the International Preliminary Examining Authority Issue in Application No. PCT/US2014/040108, Apr. 29, 2015, WIPO, 6 Pages.

Oishi, et al., "Smoothing Range Image using Reflectivity", Retrieved at <<http://robotics.ait.kyushu-u.ac.jp/~yumi/pdf/MPR10-3.pdf>> In Proceedings of IEEJ Transactions on Electronics, Information and Systems; ISSN:0385-4221; vol. 132; No. 2, Retrieved Date: Feb. 9, 2013, p. 1.

Park, et al., "An Iterative Joint Bilateral Filtering for Depth Refinement of a 3D Model", Retrieved at <<http://ideg.gist.ac.kr/minkipark/sga11.pdf >> Jan. 12, 2011, p. 1.

Kim, et al., "Spatial and Temporal Enhancement of Depth Images Captured by a Time-of-flight Depth Sensor", Retrieved at <<http://imaging.utk.edu/publications/papers/2010/ICPR10_sk.pdf>> In Proceedings of International Conference on Pattern Recognition, Aug. 23, 2010, pp. 4.

Schuon, et al., "High-Quality Scanning Using Time-Of-Flight Depth Superresolution", Retrieved at <<http://gvv.mpi-inf.mpg.de/files/old_site_files/TOF_CV_Superresolution_final.pdf>> In Proceedings of Computer Vision and Pattern Recognition Workshops, of IEEE Computer Society Conference, Jun. 23, 2008, pp. 7.

He, et al., "Guided Image Filtering", Retrieved at <<http://research.microsoft.com/en-us/um/people/kahe/publications/pami12guidedfilter.pdf>> In Proceedings of the 11th European conference on Computer vision: Part I, Sep. 5, 2010, pp. 14.

The State Intellectual Property Office of China, Office Action and Search Report Issued in Chinese Patent Application No. 201480031837.0, Dec. 2, 2016, China, 7 pages. (Submitted with English Summary of Objections Raised in the Office Action as explanation of relevance).

* cited by examiner

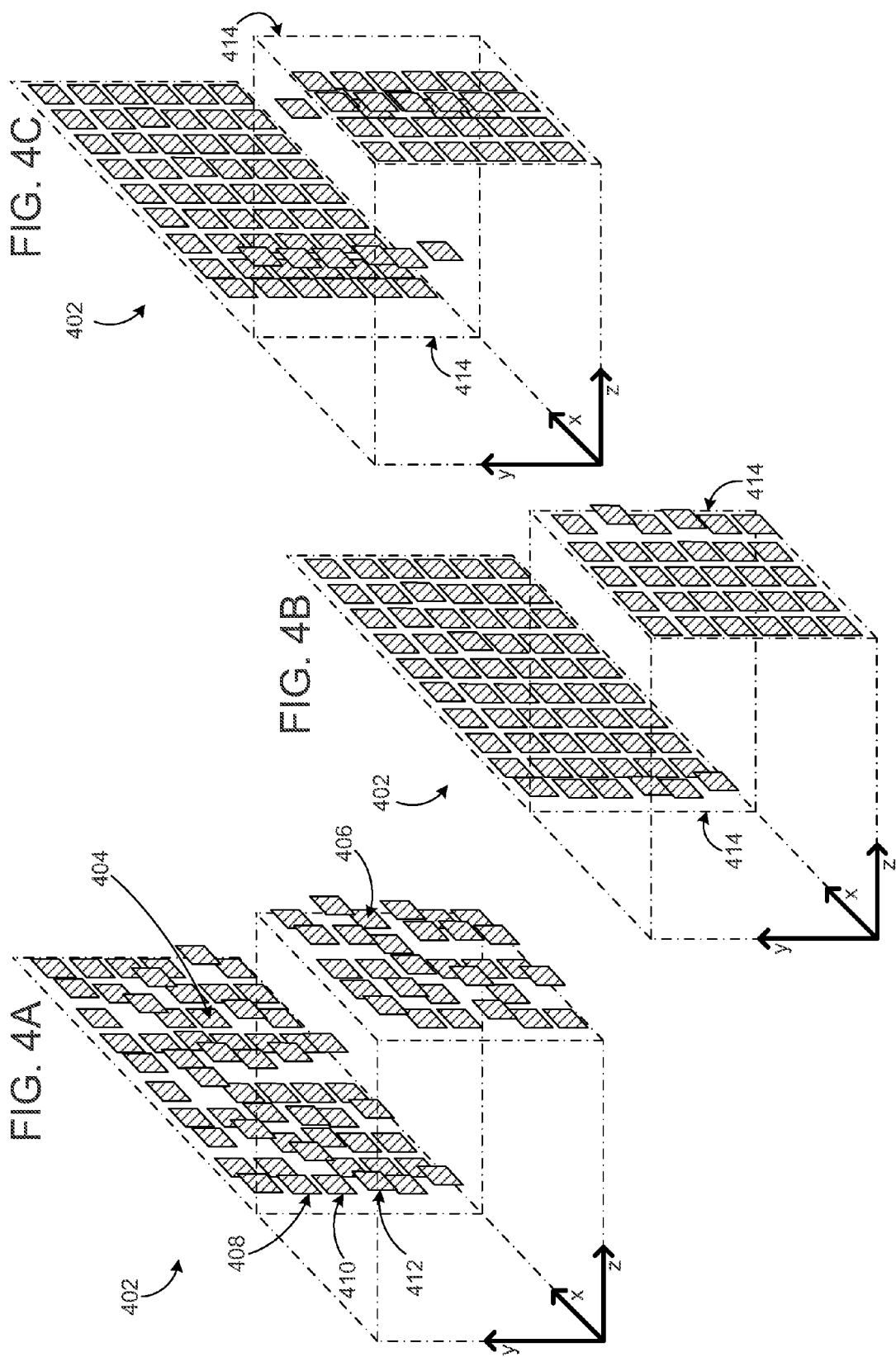

EDGE PRESERVING DEPTH FILTERING

BACKGROUND

Depth cameras are used to generate depth images that include a plurality of pixels. Each pixel includes information useable to assess a distance from the camera to the surface imaged by that pixel. This distance may be referred to as the depth of the surface. However, the pixel information may be noisy or include defects that ultimately result in less accurate depth assessments.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A scene is illuminated with modulated illumination light that reflects from surfaces in the scene as modulated reflection light. Each of a plurality of pixels of a depth camera receive the modulated reflection light and observe a phase difference between the modulated illumination light and the modulated reflection light. For each of the plurality of pixels, an edginess of that pixel is recognized, and that pixel is smoothed as a function of the edginess of that pixel.

BRIEF DESCRIPTION OF THE DRAWINGS

FIG. 4A schematically shows a group of pixels before smoothing.

FIG. 4B schematically shows the pixels of FIG. 4A after smoothing with edge preservation.

FIG. 4C schematically shows the pixels of FIG. 4A after smoothing without edge preservation.

DETAILED DESCRIPTION

Time-of-flight depth cameras illuminate a scene with modulated light and then capture the reflected modulated light. Each pixel of the depth camera is used to ascertain a phase difference between the illumination light and the reflected light. Such phase differences may be used to calculate the distance from the camera to the surface reflecting the modulated light. However, such calculated distances may be adversely affected by noise and/or other undesired pixel-to-pixel variations in the phase differences acquired by the depth camera. To decrease potential adverse effects caused by such noise and/or other variations, the present disclosure describes filtering phase differences. Further, such smoothing is selectively applied so as to preserve legitimate depth edges. In particular, little to no smoothing is applied to those pixels that are believed to image the boundary between surfaces having different depths.

Figure 1:
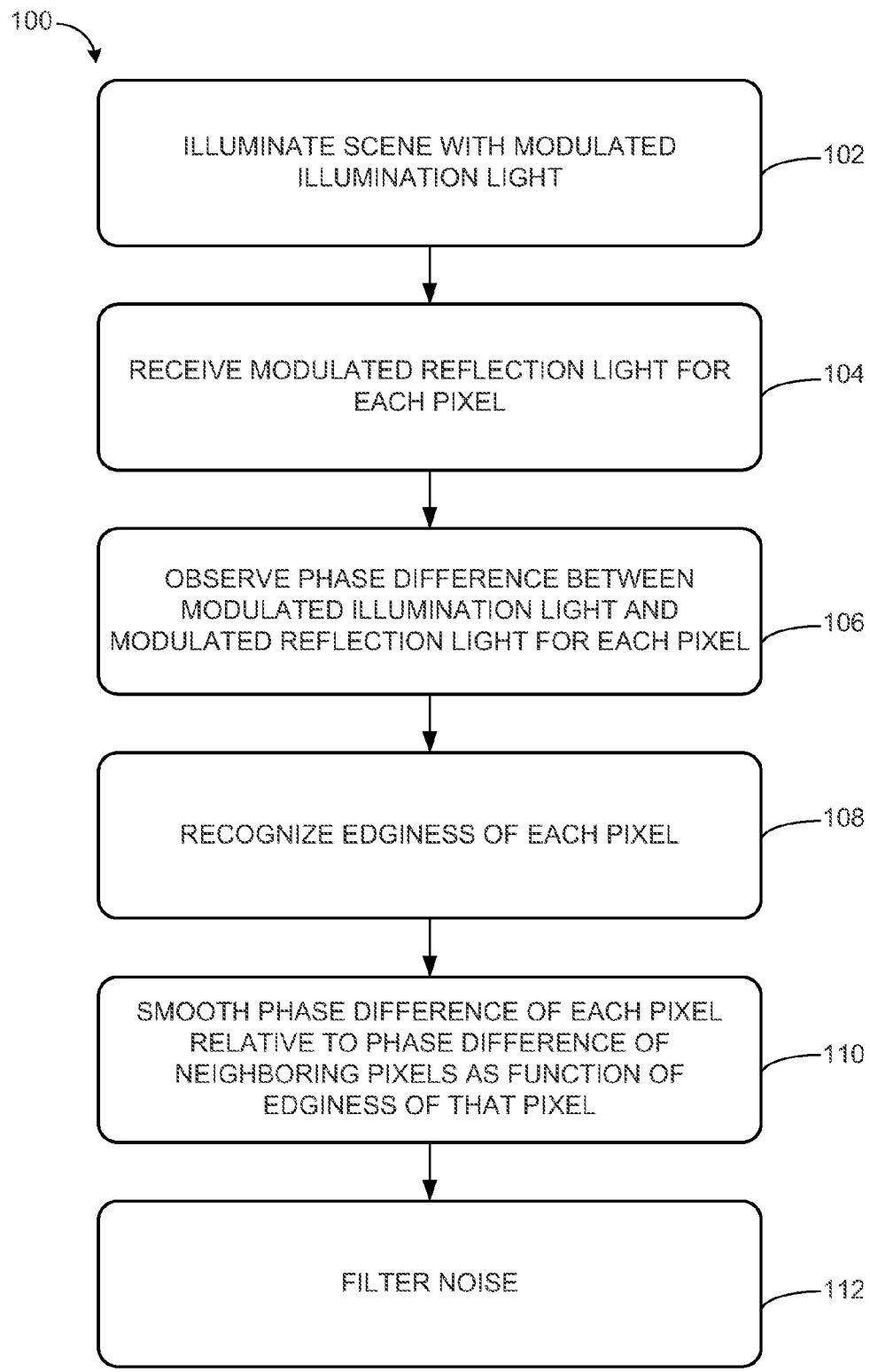
FIG. 1 shows an example method of filtering depth information in accordance with an embodiment of the present disclosure.

FIG. 1 shows a method 100 of filtering depth information. At 102, method 100 includes illuminating a scene with modulated illumination light. The modulated illumination light may include light having a plurality of different modulation frequencies. As one nonlimiting example, the modulated illumination light may include light having a 16 Megahertz component, an 80 Megahertz component, and a 120 Megahertz component.

Figure 2:
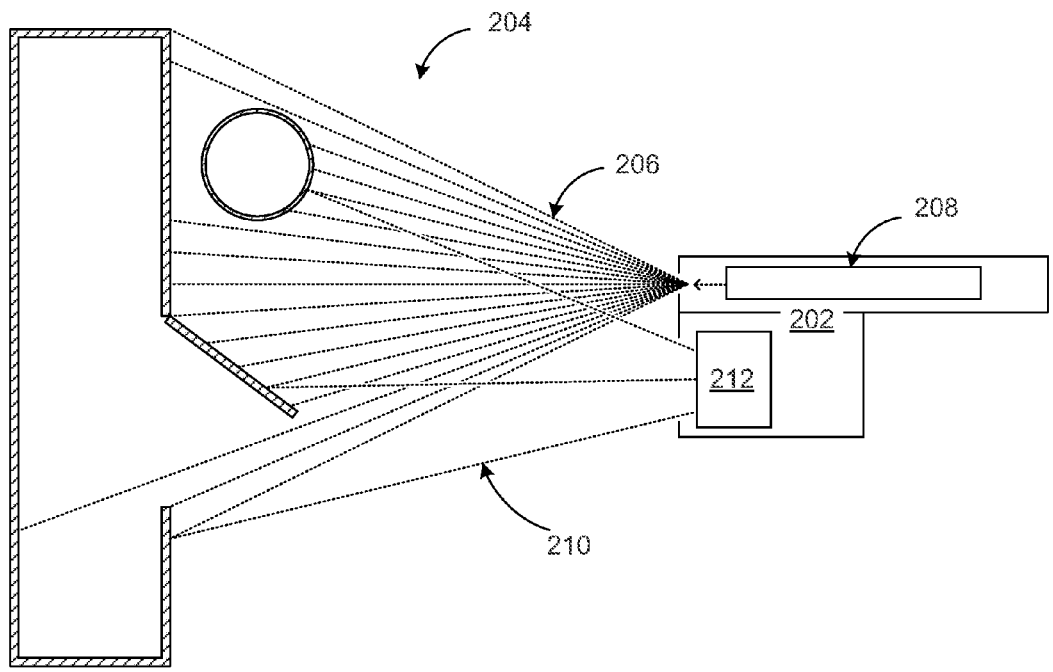
FIG. 2 schematically shows a time of flight depth camera imaging a scene.

For example, FIG. 2 schematically shows a depth camera 202 illuminating a scene 204 with modulated illumination light 206. In particular, depth camera 202 includes an illuminator 208 that shines modulated illumination light 206 on scene 204. The illuminator may include one or more light emitting diodes, lasers, and/or other light sources. The modulated illumination light 206 may be any suitable singular or plural frequency or band of frequencies. For example, the modulated illumination light may be entirely within one or more bands of infrared or near infrared light.

Turning back to FIG. 1, at 104, method 100 includes receiving modulated reflection light. For example, FIG. 2 shows depth camera 202 receiving modulated reflection light 210, which reflects back to depth camera 202 from surfaces in scene 204.

The depth camera 202 may include a plurality of pixels 212 configured to receive the modulated reflection light 210. Each of the plurality of pixels 212 can be configured to detect a time-varying amplitude of the received reflection light for one or more different modulation frequencies. As such, each pixel is able to ascertain the particular modulation of the reflection light reaching that pixel. As one nonlimiting example, each pixel may be configured to sample an intensity of the modulated light at three different times, thus allowing the phase of a periodic modulation to be determined. Further, each pixel may do such sampling for each of the different modulation frequencies.

Turning back to FIG. 1, at 106, method 100 includes observing a phase difference between the modulated illumination light and the modulated reflection light at each of a plurality of pixels. The phase difference may be observed for each different modulation frequency of the modulated illumination light. As one example, the data captured from the depth camera for each pixel may be represented as:

$$P_i = Ae^{-i\phi} = A\cos\phi + iA\sin\phi,$$

Where A is the modulated amplitude and $\phi$ is the phase difference.

Figure 3:
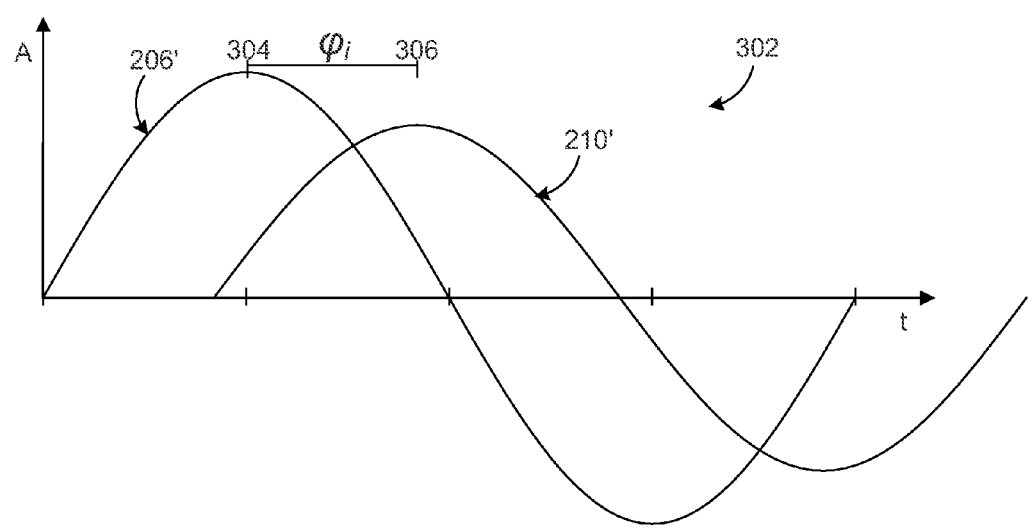
FIG. 3 schematically shows a phase difference between a time of flight depth camera's modulated illumination and reflection light.

For example, FIG. 3 schematically shows an idealized plot 302 of modulated illumination light 206' and modulated reflection light 210' for one pixel and one modulation frequency. Time (t) is represented on the horizontal axis and amplitude (A) is represented on the vertical axis. The time at which illumination light 206' is output may be compared to the time at which corresponding reflection light 210' is detected based on the matching modulation parameters of the corresponding illumination and reflection light. For example, if the illumination light has periodic maxima, minima, and/or other recognizable parameters, such parameters may be identified in the reflection light. FIG. 3 shows an observable phase difference $\phi_i$ between a local maxima 304 of modulated illumination light 206' and a corresponding local maxima 306 of modulated reflection light 210'. While FIG. 3 shows that the phase difference may be determined based on a time lag between illuminating with a maximum modulated intensity and observing a corresponding maximum modulated intensity in the reflection light, it is to be understood that any suitable signal analysis may be used to determine the phase difference. Similarly, while FIG. 3 shows sine wave modulation, it is to be understood that any suitable modulation may be used.

A detected phase difference may be used to calculate a distance from the camera to the surface reflecting the light, because the light's round trip time of flight is proportional to the distance of the reflecting surface. As such, the depth of the surface can be expressed as a function of the detected phase difference.

FIG. 4A shows a visual representation of the relative phase differences for a plurality of pixels 402 for one modulation frequency. In FIG. 4A, the x and y coordinates of each pixel correspond to that pixel's location relative to other pixels. The z coordinate of each pixel corresponds to the phase difference detected for that pixel and that modulation frequency. Pixels with a greater z coordinate have a greater phase difference. Amplitude is not represented in FIG. 4A. Furthermore, it is to be understood that the z coordinate represents the phase difference, which can be used to calculate actual depth, but which does not itself equal depth.

Turning back to FIG. 1, at 108, method 100 includes, for each of the plurality of pixels, recognizing an edginess of that pixel for that modulation frequency. The edginess of a particular pixel is a measure of the relative phase difference of that pixel compared to the relative phase difference(s) of one or more neighboring pixels. A pixel that neighbors other pixels having similar phase differences will have a relatively low edginess. On the other hand, a pixel neighboring pixels having significantly different phase differences will have a relatively high edginess.

Using FIG. 4A as an example, pixel 404 has a relatively low edginess because it has approximately the same phase difference (i.e., z coordinate) as all of its neighboring pixels. On the other hand, pixel 406 has a relatively high edginess because three of its neighboring pixels (pixel 408, pixel 410, and pixel 412) have a significantly different phase difference (i.e., z coordinate).

A numeric value may be used to represent the edginess of a particular pixel. For example, an $Edge_i$ of a pixel relative to one neighboring pixel may be calculated as follows:

$$Edge_i = \frac{\left(1 - \frac{P_i \cdot P_j}{|P_i||P_j|}\right)}{2}$$

Where $P_i$ is a vector with an angle equal to a phase difference of the pixel for a particular modulation frequency, and $P_j$ is a vector with an angle equal to a phase difference of the neighboring pixel for that particular modulation frequency.

$Edge_i$ may take any value between 0 and 1. As the phase difference between neighboring pixels approaches zero, $Edge_i$ approaches zero. As the phase difference between neighboring pixels approaches 180°, $Edge_i$ approaches 1. As such, using this example approach, an edginess of a particular pixel relative to a neighboring pixel may be represented with a minimum numeric value of 0 to a maximum numeric value of 1. It is to be understood that other numeric assignments can be made without departing from the scope of this disclosure.

Similarly, an $Edge_{ij}$ of the pixel relative to each pixel in a set N of neighboring pixels may be calculated as follows:

$$Edge_{ij} = \sum_{j \in N} \frac{\left(1 - \frac{P_i \cdot P_j}{|P_i||P_j|}\right)}{2}.$$

At most, a pixel has eight neighboring pixels (i.e., N=8). Pixels on a boundary of a depth image have only five neighboring pixels (i.e., N=5), and pixels on a corner of a depth map have only three neighboring pixels (i.e., N=3). For simplicity of explanation, the following discussion is directed to the mid-field pixels in which N=8. However, it is to be understood that edginess values may be normalized to account for pixels having any relative position in the field.

$Edge_{ij}$ may take any value between 0 and 8 when N=8. As such, an edginess of a particular pixel relative to all neighboring pixels may be represented with a minimum numeric value of 0 to a maximum numeric value of 8. It is to be understood that other numeric assignments can be made without departing from the scope of this disclosure. Further, this value can be normalized as discussed above.

Figure 5A:
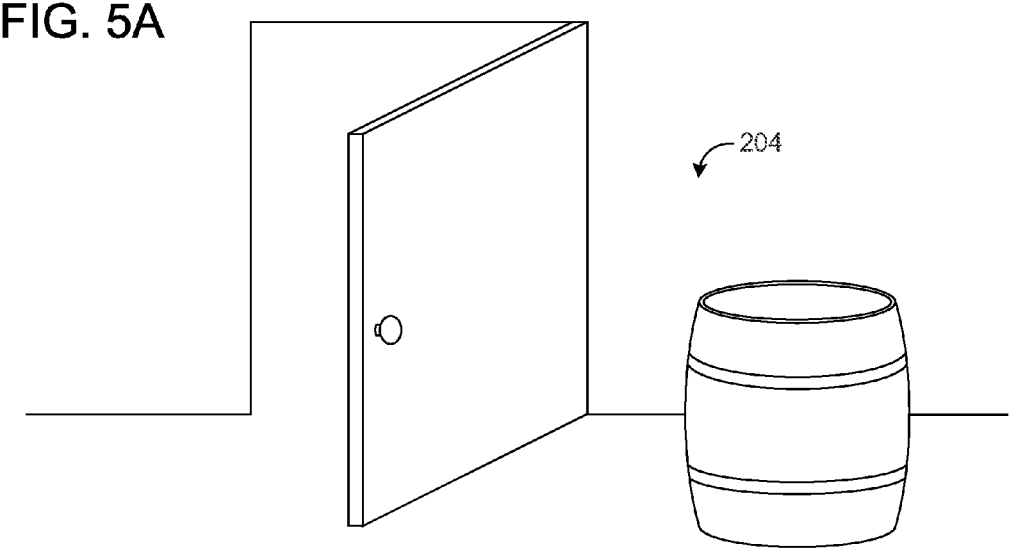
FIG. 5A shows the imaged scene of FIG. 2 from the perspective of the time of flight depth camera.
Figure 5B:
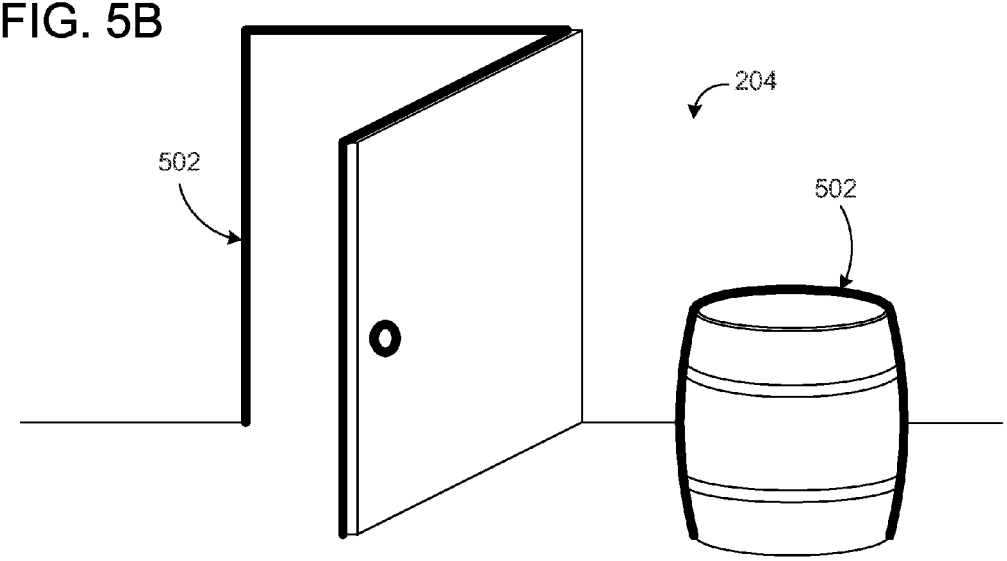
FIG. 5B shows the scene of FIG. 5A with an edge-map overlay.

FIGS. 5A and 5B provide a visual representation of the above described concept of edginess. In particular, FIG. 5A shows scene 204 of FIG. 2 from the perspective of depth camera 202. FIG. 5B shows the same scene 204 with an edge-map overlay 502 indicating pixels above a threshold edginess. In the illustrated example, pixels having an edginess of 2 or greater are represented with a bold line.

Turning back to FIG. 1, at 110, method 100 includes, for each of the plurality of pixels and for each of the modulation frequencies, smoothing the phase difference of that pixel relative to phase differences of one or more neighboring pixels. Such smoothing may be performed as a function of the edginess of that pixel to preserve legitimate edges in a scene. For example, edge preservation may be achieved by heavily smoothing pixels with low $Edge_{ij}$ values and lightly smoothing (or not smoothing) pixels with high $Edge_{ij}$ values.

Smoothing may be performed using any suitable technique without departing from the scope of this disclosure. As one nonlimiting example, a Gaussian smoothing operation may be used. For example, Gaussian smoothing may nudge a phase difference of a middle pixel in a 3×3 grid of pixels towards the weighted average of the 3×3 grid. Corner pixels in the grid may be given less weight than horizontal and vertical neighboring pixels. It is to be understood that such smoothing is provided only as an example, and other smoothing techniques may be used.

Regardless of the smoothing technique that is used, an edge-preserving factor may be used to lessen the smoothing effect on legitimate edges. As a nonlimiting example, the following edge preserving factor may be used:

$$e^{-k \times Edge_{ij}}$$

where k is a tunable constant. This factor ensures that if $Edge_{ij}$ approaches zero, the smoothing operation is applied without significant constraint, and if $Edge_{ij}$ approaches 8, the smoothing operation is exponentially less applied. It is to be understood that any suitable edge preserving factor may be used.

Using the example Gaussian smoothing and edge preserving factor provided above, an edge preserving joint bilateral filter that may be applied to each modulation frequency may be defined as:

$$\text{JointBilateral}_{ij} = \text{Gaussian}(\mu, \sigma) \times e^{-k \times Edge_{ij}}.$$

FIG. 4B shows the plurality of pixels 402 from FIG. 4A after smoothing with edge preservation. As can be seen, those pixels that are not located at edge 414 are heavily smoothed in comparison to the same pixels from FIG. 4A. However, pixels on edge 414 are only lightly smoothed. In contrast, FIG. 4C shows the plurality of pixels 402 from FIG. 4A after smoothing without edge preservation. As can be seen, pixels located on both sides of edge 414 are smoothed towards one another, thus adversely decreasing depth accuracy around the edge.

Turning back to FIG. 1, at 112, method 100 optionally includes noise filtering. Such filtering may be performed before or after smoothing. Noise in a depth camera can adversely affect the accuracy of the captured signal. Noise filtering can mitigate these adverse effects.

Noise filtering may include identifying pixels that are believed to have phase differences that do not accurately represent the true phase difference between modulated illumination and reflection light. Once such pixels are identified, the identified pixels can be ignored in subsequent operations or replacement values may be assigned to the pixels (e.g., based on neighboring pixels).

Figure 6A:
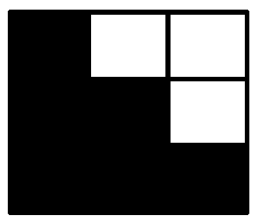
FIG. 6A schematically shows a 3×3 grid of pixels with a legitimate edge.
Figure 6B:
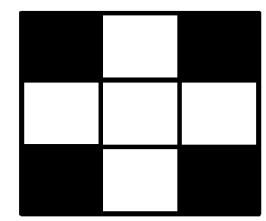
FIG. 6B schematically shows a 3×3 grid of pixels with noise and no legitimate edge.

The above described edginess may be used to identify noisy pixels. For example, FIGS. 6A and 6B schematically show two different 3×3 grids of pixels. The grids are schematically coded such that black pixels have approximately the same edginess as other black pixels, and white pixels have approximately the same edginess as other white pixels. However, black and white pixels do not have approximately the same edginess compared to each other.

A straight edge can split a 3×3 grid at any location. However, to achieve a high edge intensity, the edge will pass through the middle pixel. In such a case, only three (or less) pixels in the grid will have a different edginess compared to the middle pixel. For example, in FIG. 6A, only the top right three pixels differ from the middle pixel. This may be referred to as an edge intensity of 3. In contrast, the edge intensity of the noisy arrangement depicted in FIG. 6B is 4 because four pixels differ from the middle pixel. As such, a middle pixel in a 3×3 grid may be recognized as legitimate if that pixel has an edge intensity of 3 or less. Conversely, a middle pixel in a 3×3 grid may be recognized as noise if that pixel has an edge intensity greater than 3.

The above described edge-preserving smoothing and optional noise filtering provide several advantages over other smoothing and/or filtering approaches. In particular, such smoothing can provide substantial smoothing while preserving legitimate edges. Furthermore, the above described approach does not need any auxiliary sensor (e.g., 2D color camera), registration, and/or calibration phase. It can be accomplished using only data from the time of flight sensor. Furthermore, the edges may be preserved based on phase differences from the sensor without having to use the phase differences to calculate the actual observed depths. Further still, most noise may be filtered without the need of a separate filter. Finally, these procedures may be run in real-time in a single pass. As such, the above described filtering may be accomplished for each frame of analyzed information in 0.4 milliseconds or less with state of the art hardware. These speeds are substantially faster than other approaches that use multiple passes, multiple sensors (i.e., time of flight plus 2D color camera), and/or a registration or calibration phases.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
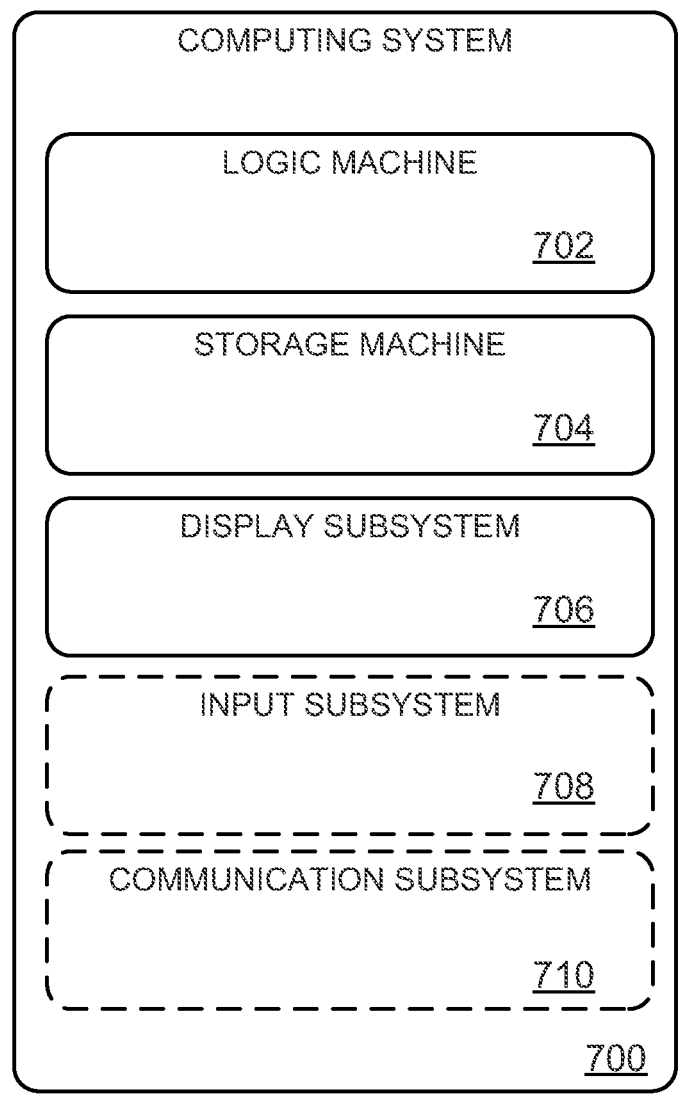
FIG. 7 schematically shows a computing system in accordance with an embodiment of the present disclosure.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), augmented reality head mounted displays, and/or other computing devices.

Computing system 700 includes a logic machine 702 and a storage machine 704. Computing system 700 may optionally include a display subsystem 706, input subsystem 708, communication subsystem 710, and/or other components not shown in FIG. 7.

Logic machine 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, or game controller. In particular, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, steroscopic, and/or depth camera for machine vision and/or gesture recognition (e.g., depth camera 202 of FIG. 2); a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of filtering depth information, the method comprising:
    illuminating a scene with a modulated illumination light having a plurality of different modulation frequencies, the modulated illumination light reflecting from surfaces in the scene as modulated reflection light;
    receiving at each of a plurality of pixels the modulated reflection light;
    observing a phase difference between the modulated illumination light and the modulated reflection light at each of the plurality of pixels for each of the modulation frequencies;
    for each of the plurality of pixels and modulation frequencies, recognizing an edginess of that pixel corresponding to a relative difference between the phase difference of that pixel and phase differences of one or more neighboring pixels; and
    for each of the plurality of pixels and modulation frequencies, smoothing the phase difference of that pixel relative to phase differences of one or more neighboring pixels as a function of the edginess of that pixel such that greater edginess corresponds to less smoothing and lesser edginess corresponds to more smoothing.

2. The method of claim 1, wherein recognizing an edginess of a pixel includes calculating an $Edge_i$ of the pixel relative to a neighboring pixel, such that $$Edge_i = \frac{\left(1 - \frac{P_i \cdot P_j}{|P_i||P_j|}\right)}{2},$$

where $P_i$ is a vector with an angle equal to a phase difference of the pixel, and $P_j$ is a vector with an angle equal to a phase difference of the neighboring pixel.

3. The method of claim 2, wherein recognizing an edginess of the pixel includes calculating an $Edge_{ij}$ of the pixel relative to each pixel in a set N of neighboring pixels, such that $$Edge_{ij} = \sum_{j \in N} \frac{\left(1 - \frac{P_i \cdot P_j}{|P_i||P_j|}\right)}{2}.$$

4. The method of claim 3, wherein smoothing the phase difference of the pixel relative to phase differences of one or more neighboring pixels includes smoothing with an edge-preserving factor of $e^{-k \times Edge_{ij}}$, where k is a tunable constant.

5. The method of claim 4, wherein smoothing the phase difference of the pixel relative to phase differences of one or more neighboring pixels includes Gaussian smoothing the phase difference.

6. The method of claim 1, wherein smoothing the phase difference of the pixel relative to phase differences of one or more neighboring pixels includes Gaussian smoothing the phase difference.

7. The method of claim 6, wherein smoothing the phase difference of the pixel relative to phase differences of one or more neighboring pixels includes Gaussian smoothing with an edge-preserving factor.

8. The method of claim 1, further comprising noise filtering.

9. The method of claim 8, further comprising noise filtering smoothed phase differences.

10. The method of claim 8, wherein noise filtering includes ignoring pixels having noisy phase differences.

11. The method of claim 8, wherein noise filtering includes filtering pixels having an edge intensity greater than a tunable threshold.

12. A method of filtering depth information, the method comprising:
- illuminating a scene with a modulated illumination light, the modulated illumination light reflecting from surfaces in the scene as modulated reflection light;
- receiving at each of a plurality of pixels the modulated reflection light;
- observing a phase difference between the modulated illumination light and the modulated reflection light at each of the plurality of pixels;
- for each of the plurality of pixels, calculating an $Edge_{ij}$ of the pixel relative to each pixel in a set of N neighboring pixels, such that $$Edge_{ij} = \sum_{j \in N} \frac{\left(1 - \frac{P_i \cdot P_j}{|P_i||P_j|}\right)}{2},$$

where $P_i$ is a vector with an angle equal to a phase difference of the pixel, and $P_j$ is a vector with an angle equal to a phase difference of the neighboring pixel;
- for each of the plurality of pixels, Gaussian smoothing the phase difference of the pixel relative to phase differences of one or more neighboring pixels with an edge-preserving factor of $e^{-k \times \Sigma Edge_{ij}}$, where k is a tunable constant.

13. The method of claim 12, further comprising noise filtering.

14. The method of claim 13, further comprising noise filtering smoothed phase differences.

15. The method of claim 13, wherein noise filtering includes ignoring pixels having noisy phase differences.

16. The method of claim 13, wherein noise filtering includes filtering pixels having an edge intensity greater than a tunable threshold.

17. A storage machine holding instructions executable by a logic machine to:
- for each of a plurality of pixels, receive a phase difference between modulated illumination light and modulated reflection light;
- for each of the plurality of pixels, recognize an edginess of that pixel corresponding to a relative difference between the phase difference of that pixel and phase differences of one or more neighboring pixels; and
- for each of the plurality of pixels, smooth the phase difference of that pixel relative to phase differences of one or more neighboring pixels as a function of the edginess of that pixel such that greater edginess corresponds to less smoothing and lesser edginess corresponds to more smoothing.

18. The storage machine of claim 17, wherein the instructions are executable to recognize the edginess of the pixel at least in part by calculating an $Edge_i$ of the pixel relative to a neighboring pixel, such that $$Edge_i = \frac{\left(1 - \frac{P_i \cdot P_j}{|P_i||P_j|}\right)}{2},$$

where $P_i$ is a vector with an angle equal to a phase difference of the pixel, and $P_j$ is a vector with an angle equal to a phase difference of the neighboring pixel.

19. The storage machine of claim 18, wherein the instructions are executable to recognize the edginess of the pixel at least in part by calculating an $Edge_{ij}$ of the pixel relative to each pixel in a set N of neighboring pixels, such that $$Edge_{ij} = \sum_{j \in N} \frac{\left(1 - \frac{P_i \cdot P_j}{|P_i||P_j|}\right)}{2}.$$

20. The storage machine of claim 19, wherein the instructions are executable to Gaussian smooth the phase difference of the pixel relative to phase differences of one or more neighboring pixels with an edge-preserving factor of $e^{-k \times \Sigma Edge_{ij}}$, where k is a tunable constant.

* * * * *